3,174,997
PHENOXYPROPYLGUANIDINE COMPOUNDS

Alfred Campbell, Ann Arbor, Mich., assignor to Parke, Davis & Company, Detroit, Mich., a corporation of Michigan
No Drawing. Filed Jan. 6, 1961, Ser. No. 80,976
6 Claims. (Cl. 260—501)

The present invention relates to 3-phenoxypropylguanidine of the formula

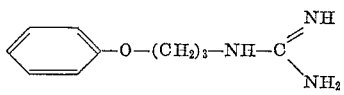

to acid-addition salts thereof, and to methods for the production of such compounds.

The 3-phenoxyphopylguanidine of this invention can be obtained in free base form having the formula given above or in the form of one of its acid-addition salts with inorganic or organic acids. Some representative non-toxic acid-addition salts are the hydrochloride, hydrobromide, hydroiodide, hemisulfate, nitrate, phosphate, citrate, acetate, tartrate, salicylate, benzoate, benzenesulfonate, and the like.

When the products of the invention are obtained as acid-addition salts, these salts can be converted to the free base by making an aqueous solution of the acid-addition salt basic with a base such as sodium hydroxide or potassium hydroxide. Alternatively the free base can be obtained by passing an aqueous solution of the acid-addition salt over an [OH⁻] ion exchange resin such as Amberlite IRA-400 [OH⁻] resin, eluting with aqueous alcohol and evaporating the solution to dryness. Formation of the various salts envisioned by and included in this invention can be carried out by reacting the free base with the selected acid in an unreactive solvent or by reacting the free base with an excess of aqueous acid, whereby the excess aqueous acid serves as solvent for the reaction. In either reaction, subsequent evaporation of the solution to dryness yields the desired salt. Further, the acid-addition salts can be interconverted by passing them over the desired anionic form of a strongly basic ion exchange resin such as Amberlite IRA-400 and the like. Thus 3-phenoxypropylguanidine nitrate can be converted into the corresponding hemisulfate salt by passing it over a strongly basic [SO₄⁼] ion exchange resin such as Amberlite IRA-400 [SO₄⁼] resin. Similarly the nitrate salt can be converted into the corresponding hydrochloride salt by passing it over a strongly basic [Cl⁻] ion exchange resin such as Amberlite IRA-400 [Cl⁻] resin.

In accordance with the invention 3-phenoxypropylguanidine compounds can be produced by reacting 3-phenoxypropylamine with an acid-addition salt of a reactive guanidine compound of the formula

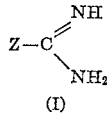

(I)

wherein Z represents any easily displaceable moiety. For purposes of this invention such moieties are: hydrocarbonthio, hydrocarbonoxy, unsubstituted, mono or poly substituted unsaturated nitrogen heterocyclic radicals containing at least two nitrogen atoms in their ring systems and connected to the guanidine carbon atom through nitrogen, and other displaceable radicals. Some examples are lower alkylthio radicals such as methylthio and ethylthio; lower alkyloxy radicals such as methoxy and ethoxy; pyrazolyl; substituted pyrasolyl radicals such as dialkylpyrazolyl, alkyl-arylpyrazolyl, and dialkylmonohalopyrazolyl; imidazolyl; triazolyl; and tetrazolyl. The reaction can be conveniently carried out by contacting the reactants either in the absence of a solvent or in the presence of unreactive solvents such as water, alcohols, chlorobenzene, dimethylformamide, and the like. The preferred solvent is water or a mixture of ethanol and water which may be varied widely in its composition. Equimolar quantities of reactants are usually used in this reaction although an excess of either reagent is not harmful. Preferably a slight excess of amine is employed. The reaction is usually carried out at a temperature of between 20-150° C. although satisfactory results can also be obtained somewhat outside of this temperature range. The preferred reaction temperature is 75-120° C. The product is isolated directly as an acid-addition salt or, following treatment with a base, as the free base, 3-phenoxypropylguanidine.

In carrying out the foregoing process, a preferred method involves reacting an acid-addition salt of 3,5-dimethyl-1-guanylpyrazole (salt corresponding to Formula I wherein Z is the 3,5-dimethylpyrazolyl radical) with 3-phenoxy-propylamine

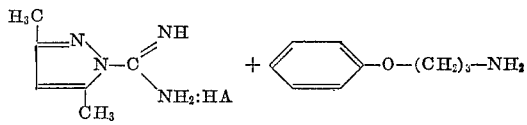

whereby 3-phenoxypropylguanidine is produced directly as an acid-addition salt. If 3,5-dimethyl-1-guanylpyrazole nitrate is used in this reaction, 3-phenoxypropylguanidine nitrate is obtained. This nitrate salt can be converted to the free base or to other acid-addition salts by procedures discussed earlier.

Another preferred method for carrying out the foregoing process involves reacting an acid-addition salt of 2-methyl-2-thiopseudourea (salt corresponding to Formula I wherein Z is a methylthio radical) with 3-phenoxypropylamine

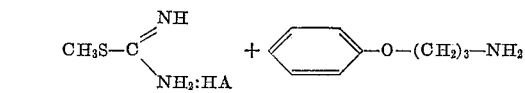

whereby 3-phenoxypropylguanidine is produced directly as an acid addition salt. If 2-methyl-2-thiopseudourea hemisulfate is used in this reaction 3-phenoxypropylguanidine hemisulfate is obtained. Conversion to the free base or to other acid-addition salts is accomplished by methods hereinbefore described.

In accordance with a second process, compounds of the invention can be prepared by reacting 3-phenoxypropylamine, preferably as an acid-addition salt such as the hydrobromide or nitrate, with cyanamide or dicyandiamide. The reaction can be conveniently carried out by contacting the reactants either in the absence of a solvent or in the presence of unreactive solvents such as water, alcohols, chlorobenzene, dimethylformamide, and the like. When cyanamide is used as the active intermediate, fusion techniques, in the absence of solvents, can be conveniently employed. In such a reaction the cyanamide and a salt of 3-phenoxypropylamine are mixed together and heated to the point of fusion. Equimolar quantities of reactants are usually used in this reaction although an excess of either reagent is not harmful. Preferably a slight excess of amine salt is employed. The temperature of the reaction depends upon the fusion point of the reaction mixture. Reaction of the amine salts with cyanamide can also be carried out in aqueous, alcoholic, or non-aqueous solution. Equimolar quantities of reactants are usually used in this reaction although an excess of either reagent is not harmful. Preferably a slight excess of amine is employed. The reaction is usually carried out at a temperature of between 20–150° C. although satisfactory results can also be obtained somewhat outside of this temperature range. The preferred temperature range is 75–120° C. When dicyandiamide is employed, the fusion technique described above is preferred.

The compounds of this invention are valuable pharmacological agents. They are psychic energizers of high activity. Their activity is exemplified by experiments in which the compounds show a potent effect in reversing the depression induced by reserpine. This is most easily seen where the ptosis induced by reserpine is antagonized. They are also hypotensive agents. They may be administered orally or parenterally. Oral administration is preferred.

The following examples are illustrative of, but not limiting on, the present invention.

*Example 1*

A solution of 70.0 g. 3-phenoxypropylamine and 100.0 g. 3,5-dimethyl-1-guanylpyrazole nitrate in 500 ml. water is heated under reflux for 15 hours. The solution is cooled to 0° C. and the precipitated 3-phenoxypropylguanidine nitrate is filtered and rinsed with ether; M.P. 100–101° C. after recrystallization from methanol/propanol.

An aqueous solution of 20.0 g. 3-phenoxypropylguanidine nitrate is made basic with sodium hydroxide, the basic solution extracted three times with ether, the ether solution dried over anhydrous sodium sulfate, and the solvent removed under reduced pressure to give 3-phenoxypropylguanidine as the free base; M.P. 82° C. after recrystallization from benzene/petroleum ether.

*Example 2*

To a stirred solution of 156.0 g. 3-phenoxypropylamine in 200 ml. water and 50 ml. ethanol at 90° C. is added, over 15–20 minutes, a solution of 187.2 g. 3,5-dimethyl-1-guanylpyrazole hemisulfate in 300 ml. water. The resulting mixture is then heated on a steam bath for four hours. Part of the ethanol-water solution is removed by evaporation under reduced pressure, the remaining solution is treated with charcoal, filtered, and cooled to 0° C. After two hours at this temperature the 3-phenoxypropylguanidine hemisulfate which has precipitated is filtered; M.P. 145–146° C. after recrystallization from water.

*Example 3*

A solution of 78.0 g. 3-phenoxypropylamine and 87.3 g. 3,5-dimethyl-1-guanylpyrazole hydrobromide in 500 ml. water is heated under reflux for ten hours. The cooled solution is extracted with three 100 ml. portions benzene and evaporated to dryness leaving 3-phenoxypropylguanidine hydrobromide; M.P. 95–96° C. after recrystallization from methanol/ether.

*Example 4*

A solution of 7.8 g. 3-phenoxypropylamine and 12.56 g. 3-methyl-5-phenyl-1-guanylpyrazole nitrate in 50 ml. water is heated under reflux for fifteen hours. The solution is cooled to 0° C. and the precipitated 3-phenoxypropylguanidine nitrate is filtered and rinsed with ether; M.P. 100–101° C. after recrystallization from methanol/propanol.

*Example 5*

To a stirred solution of 156.0 g. 3-phenoxypropylamine in 200 ml. water and 50 ml. ethanol at 90° C. is added, over 15–20 minutes, a solution of 139.0 g. 2-methyl-2-thiopseudourea hemisulfate in 300 ml. water. The resulting mixture is then heated on a steam bath for two hours. Part of the ethanol-water solution (300 ml.) is removed by evaporation under reduced pressure, the remaining solution is treated with charcoal, filtered, and cooled to 0° C. After two hours at this temperature the 3-phenoxypropylguanidine hemisulfate which has precipitated is filtered; M.P. 145–146° C. after recrystallization from water.

*Example 6*

To a stirred solution of 78.0 g. 3-phenoxypropylamine in 200 ml. water at 90° C. is added a solution of 63.3 g. 2-ethyl-2-thiopseudourea hydrochloride in 150 ml. water. The resulting mixture is heated on a steam bath for three hours, concentrated, and the concentrated aqueous solution passed over a strongly basic [OH$^-$] ion exchange resin, eluted with aqueous alcohol, and the solvent evaporated to dryness leaving 3-phenoxypropylguanidine; M.P. 82° C. after recrystallization from benzene/petroleum ether.

*Example 7*

A solution of 4.2 g. cyanamide and 23.2 g. 3-phenoxypropylamine hydrobromide in 100 ml. ethanol is refluxed for six hours, the solution evaporated to dryness, and the residue triturated with ether leaving 3-phenoxypropylguanidine hydrobromide; M.P. 95–96° C. after recrystallization from propanol/ether.

An aqueous solution of 2.0 g. 3-phenoxypropylguanidine hydrobromide is made basic with sodium hydroxide. The basic solution is extracted three times with ether, the ether solution dried over anhydrous sodium sulfate, and the solvent removed under reduced pressure to give 3-phenoxypropylguanidine as the free base; M.P. 82° C. after recrystallization from benzene/petroleum ether.

*Example 8*

Dicyandiamide (8.4 g.) and 18.7 g. 3-phenoxypropylamine hydrochloride are intimately mixed, placed in a round bottom flask equipped with a reflux condenser and thermometer, and the reaction vessel immersed in a mechanically stirred oil bath. The mixture is fused at 180° C. for three hours, subsequently cooled, water added, and the insolubles filtered. The aqueous solution is made alkaline with sodium hydroxide, extracted with ether, the ether solution dried over sodium sulfate, filtered, and evaporated to dryness leaving a residue of 3-phenoxypropylguanidine; M.P. 82° C. after recrystallization from benzene/petroleum ether.

*Example 9*

When an aqueous solution of 10.0 g. 3-phenoxypropylguanidine hemisulfate is passed over a column containing 60.0 g. of a strongly basic [Br$^-$] ion exchange resin, the column eluted with aqueous alcohol, and the alcohol removed in vacuo, 3-phenoxypropylguanidine hydrobromide remains; M.P. 95–96° C.

Likewise, when an aqueous solution of 10.0 g. 3-phenoxypropylguanidine hydrobromide is passed over a column containing 60.0 g. of a strongly basic [SO$_4$$^=$] ion exchange resin, the column eluted with aqueous alcohol, and the solvent evaporated, 3-phenoxypropylguanidine hemisulfate is obtained; M.P. 145–146° C. after recrystallization from water.

*Example 10*

Free 3-phenoxypropylguanidine (5.0 g.) is dissolved in a 20% excess of 50% aqueous acetic acid and the solution evaporated to dryness under reduced pressure leaving a residue of 3-phenoxypropylguanidine acetate; M.P. 140–141° C. after recrystallization from methanol/ether.

*Example 11*

Free 3-phenoxypropylguanidine (5.0 g.) is dissolved in 20 ml. ether and 1 equivalent hydrogen bromide added. Removal of the solvent leaves 3-phenoxypropylguanidine hydrobromide; M.P. 95–96° C.

*Example 12*

A 10% aqueous solution of sulfuric acid is added to 5.0 g. 3-phenoxypropylguanidine in 10 ml. ethanol. Removal of solvent leaves 3-phenoxypropylguanidine hemisulfate; M.P. 145–146° C. after recrystallization from water.

I claim:
1. A member of the class consisting of 3-phenoxypropylguanidine and its non-toxic acid-addition salts.
2. A non-toxic acid addition salt of 3-phenoxypropylguanidine.
3. 3-phenoxypropylguanidine.
4. 3-phenoxypropylguanidine hemisulfate.
5. 3-phenoxypropylguanidine acetate.
6. 3-phenoxypropylguanidine nitrate.

References Cited in the file of this patent
UNITED STATES PATENTS 1,805,889    Schoeller et al. _____ May 19, 1931

OTHER REFERENCES

Kuroda i: "Chem. Abs.," vol. 28, 1934, page 7362 [1].
Kuroda ii: "Chem. Abs.," vol. 29, 1935, page 1504 [8].
Buck et al.: "J. Am. Chem. Soc.," vol. 64, pages 2231–2 (1942).
Scott et al.: Nature, vol. 169, pp. 72–73 (1952).